US011976676B2

(12) United States Patent
Quan et al.

(10) Patent No.: US 11,976,676 B2
(45) Date of Patent: May 7, 2024

(54) HYDRAULIC-ELECTRIC COUPLING DRIVEN MULTI-ACTUATOR SYSTEM AND CONTROL METHOD

(71) Applicant: Taiyuan University of Technology, Taiyuan (CN)

(72) Inventors: Long Quan, Taiyuan (CN); Shufei Qiao, Taiyuan (CN); Yunxiao Hao, Taiyuan (CN); Lei Ge, Taiyuan (CN); Bo Wang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 17/985,205

(22) Filed: Nov. 11, 2022

(65) Prior Publication Data

US 2023/0151830 A1 May 18, 2023

(30) Foreign Application Priority Data

Nov. 17, 2021 (CN) ......................... 202111358343.1

(51) Int. Cl.
*F15B 15/08* (2006.01)
*E02F 9/22* (2006.01)
(Continued)

(52) U.S. Cl.
CPC ............ *F15B 15/088* (2013.01); *F15B 13/06* (2013.01); *E02F 9/2203* (2013.01); *E02F 9/2271* (2013.01);
(Continued)

(58) Field of Classification Search
CPC ....... E02F 9/2075; E02F 9/2203; F15B 13/06; F15B 15/088; F15B 2015/206
See application file for complete search history.

(56) References Cited

U.S. PATENT DOCUMENTS 7,397,209 B2 * 7/2008 Hirai ..................... F15B 15/088 310/112
11,092,175 B1 * 8/2021 Blanding .............. B64C 13/504
(Continued)

FOREIGN PATENT DOCUMENTS

CN 107477051 A * 12/2017 ................ F15B 1/02
CN 202110189350.7 A 4/2021

OTHER PUBLICATIONS

CN107477051A_t machine translation thereof (Year: 2017).*
CN202110189350.7A_t machine translation thereof (Year: 2021).*

*Primary Examiner* — Kenneth Bomberg
*Assistant Examiner* — Matthew Wiblin
(74) *Attorney, Agent, or Firm* — AVEK IP, LLC

(57) ABSTRACT

A hydraulic-electric coupling driven multi-actuator system and control method are provided. The system comprises one or more hydraulic-electric hybrid driven actuators, first inverters, control valves, centralized hydraulic units and control units, wherein each hydraulic-electric hybrid driven actuator is correspondingly connected with one first inverter and one control valve; the centralized hydraulic units are connected with the control valves and configured to supply oil for the hydraulic-electric hybrid driven actuators and to perform power compensation; and the control units are respectively connected with the hydraulic-electric hybrid driven actuators, and each control unit is configured to control output torque of a first motor of the corresponding hydraulic-electric hybrid driven actuator based on pressure information of the hydraulic-electric hybrid driven actuator, such that pressure of driving cavities of the hydraulic-electric hybrid driven actuators is equal.

6 Claims, 4 Drawing Sheets

(51) Int. Cl.
*F15B 13/06* (2006.01)
*F15B 15/20* (2006.01)

(52) U.S. Cl.
CPC ....... *E02F 9/2296* (2013.01); *F15B 2015/206* (2013.01)

(56) References Cited

U.S. PATENT DOCUMENTS

| | | | | |
|---|---|---|---|---|
| 2004/0021441 | A1* | 2/2004 | Komiyama | B60W 10/24 320/104 |
| 2006/0021348 | A1* | 2/2006 | Neumann | F15B 15/14 60/716 |
| 2007/0051405 | A1* | 3/2007 | Nakada | F15B 15/14 91/361 |
| 2016/0312440 | A1* | 10/2016 | Izumi | F15B 15/088 |
| 2017/0356163 | A1* | 12/2017 | Hita | E02F 9/26 |
| 2019/0360506 | A1* | 11/2019 | Hasuo | F15B 15/20 |
| 2020/0132209 | A1* | 4/2020 | Orino | F15B 20/002 |
| 2020/0318319 | A1* | 10/2020 | Shimizu | E02F 9/2004 |

* cited by examiner

HYDRAULIC-ELECTRIC COUPLING DRIVEN MULTI-ACTUATOR SYSTEM AND CONTROL METHOD

CROSS-REFERENCE TO RELATED APPLICATION

This patent application claims the benefit and priority of Chinese Patent Application No. 202111358343.1 filed on Nov. 17, 2021, the disclosure of which is incorporated by reference herein in its entirety as part of the present application.

TECHNICAL FIELD

The present disclosure relates to technical field of hydraulic transmission and electro-mechanical transmission, and in particular to a hydraulic-electric coupling driven multi-actuator system and control method.

BACKGROUND

Hydraulic systems are widely applied in various non-road mobile equipment such as aerospace, deep-sea equipment, construction machinery, road construction machinery, mining machinery, forestry machinery and agricultural machinery due to their advantages such as high power density. At present, centralized power supply and multi-way valve power distribution modes are generally adopted in most of multi-actuator hydraulic systems. An output pressure of a pump is matched with a maximum load association, and the other associations compensate for influence of load difference through the respective pressure compensators, which results in large throttling losses on the pressure compensators and control valves of the low-load associations and low overall energy efficiency of the system. In addition, there is a serious problem of kinetic and potential energy waste in the equipment with a lifting device.

In an electro-mechanical actuator driven system, the rotary motion of the motor is converted into the linear motion through mechanical transmission. Compared with hydraulic driving, electro-mechanical actuator driving has advantages of energy saving, environmental protection, easy control, high control accuracy and the like, but the electro-mechanical actuator has low power density and poor carrying capacity. Moreover, at present, driving systems of single electro-mechanical actuators are simply superposed to form the driving system of multiple electro-mechanical actuators, and the overall installed power of the system is large.

Based on the above-mentioned problem, a novel multi-actuator control system is urgently needed to reduce throttling loss and installed power.

SUMMARY

An objective of the present disclosure is to provide a hydraulic-electric coupling driven multi-actuator system and control method, which may reduce throttling loss and installed power.

In order to achieve the above objective, the present disclosure provides the following solution.

A hydraulic-electric coupling driven multi-actuator system includes:

one or more hydraulic-electric hybrid driven actuators;

first inverters, control valves and pressure sensor groups; wherein the number of the first inverters, the number of the control valves and the number of the pressure sensor groups are the same as the number of hydraulic-electric hybrid driven actuators, respectively;

each hydraulic-electric hybrid driven actuator is correspondingly connected with one first inverter, one control valve and one pressure sensor group; the pressure sensor group is configured to detect pressure information of a corresponding hydraulic-electric hybrid driven actuator;

centralized hydraulic units connected with the control valves and configured to supply oil for the hydraulic-electric hybrid driven actuators and to perform power compensation; and motor controllers, each motor controller being configured to control output torque of a first motor of the corresponding hydraulic-electric hybrid driven actuator based on pressure information of the hydraulic-electric hybrid driven actuator, such that pressure of the driving cavities of the hydraulic-electric hybrid driven actuators is equal.

In an embodiment, the hydraulic-electric hybrid driven actuator may include:

the first motor;

a speed reducer connected with the first motor;

a cylinder barrel fixedly connected with the speed reducer;

a push rod arranged in the cylinder barrel and movably connected with the cylinder barrel;

a lead screw arranged in the cylinder barrel; wherein one end of the lead screw is connected with the speed reducer, and another end of the lead screw is connected with the push rod through a screw transmission pair; and the lead screw performs rotary motion under the control of the first motor and the speed reducer, and further drives the push rod to perform linear motion through the screw transmission pair;

a sealing member arranged between the push rod and the cylinder barrel; wherein the cylinder barrel is divided into two cavities by the sealing member, i.e., a rodless cavity close to the speed reducer and a rod cavity close to the push rod;

wherein working oil ports of each control valve respectively communicate with two cavities of the corresponding hydraulic-electric hybrid driven actuator; the control valve is configured to provide power compensation for the corresponding hydraulic-electric hybrid driven actuator through the working oil ports based on torque information output by the first motor of the corresponding hydraulic-electric hybrid driven actuator; and an oil return port of the control valve communicates with an oil tank.

In an embodiment, the pressure sensor group may include:

a first pressure sensor connected with the rodless cavity of the corresponding hydraulic-electric hybrid driven actuator and configured to detect pressure information of the rodless cavity of the corresponding hydraulic-electric hybrid driven actuator; and a second pressure sensor connected with the rod cavity of the corresponding hydraulic-electric hybrid driven actuator and configured to detect pressure information of the rod cavity of the corresponding hydraulic-electric hybrid driven actuator.

In an embodiment, the centralized hydraulic unit may include a second inverter, a second motor, a hydraulic pump, an oil tank, an oil supply pipeline, an overflow valve, a bypass proportional valve and a shuttle valve; wherein the second motor is connected with the second inverter;

the hydraulic pump is coaxially connected with the second motor, an oil suction port of the hydraulic pump communicates with the oil tank, and an oil outlet of the hydraulic pump communicates with the oil supply pipeline;

the overflow valve respectively communicates with the oil supply pipeline and the oil tank;

the shuttle valve is connected with a load detection end of a control valve corresponding to each hydraulic-electric hybrid driven actuator and configured to detect a maximum load pressure of the hydraulic-electric hybrid driven actuator; and the bypass proportional valve is provided with a first working oil port, a second working oil port, a third working oil port, a spring end and a pressure detection end; wherein the first working oil port of the bypass proportional valve communicates with the oil tank; the second working oil port of the bypass proportional valve communicates with an energy accumulator; the third working oil port of the bypass proportional valve communicates with the oil supply pipeline; and the spring end of the bypass proportional valve is connected with the shuttle valve and configured to detect maximum load feedback pressure of each hydraulic-electric hybrid driven actuator;

the pressure detection end of the bypass proportional valve is connected with the oil supply pipeline and configured to detect outlet pressure of the hydraulic pump; and the bypass proportional valve is controlled by the outlet pressure of the hydraulic pump, load feedback pressure and spring force, such that the outlet pressure of the hydraulic pump is always higher than load pressure by a fixed value.

In an embodiment, the hydraulic-electric coupling driven multi-actuator system may further include:

a direct-current bus respectively connected with the first inverter and the second inverter and configured to perform energy distribution and energy sharing on each hydraulic-electric hybrid driven actuator.

In an embodiment, the hydraulic-electric coupling driven multi-actuator system may further include a power switch, a rectifier, a direct current-direct current (DC-DC) converter and a super-capacitor group sequentially connected on the direct-current bus.

In order to achieve the above objective, the present disclosure further provides the following solution.

A hydraulic-electric coupling driven multi-actuator control method includes:

controlling operating speed of each hydraulic-electric hybrid driven actuator by the respective associated first motor when a plurality of hydraulic-electric hybrid driven actuators under load difference co-operate;

performing power compensation on electric driving of each hydraulic-electric hybrid driven actuator by centralized hydraulic units in a unified mode; and adjusting output torque of the first motor of each hydraulic-electric hybrid driven actuator, and controlling pressure of a driving cavity of the hydraulic-electric hybrid driven actuator based on pressure information of the hydraulic-electric hybrid driven actuator, such that the pressure of the driving cavities of the hydraulic-electric hybrid driven actuators is equal.

In an embodiment, the hydraulic-electric coupling driven multi-actuator control method may further include:

controlling a bypass proportional valve, such that outlet pressure of a hydraulic pump is higher than a maximum load pressure by a fixed value and the openings of the associated control valves are the biggest.

In an embodiment, the hydraulic-electric coupling driven multi-actuator control method may further include:

calculating demand flow of each associated hydraulic-electric hybrid driven actuator based on flow matching principle; and adjusting a swash plate swing angle of a hydraulic pump based on the demand flow to control output flow of the hydraulic pump to be consistent with the demand flow.

According to specific embodiments provided in the present disclosure, the present disclosure has the following technical effects: pressure information of each hydraulic-electric hybrid driven actuator is detected by a pressure sensor, and based on the pressure information, the output torque of a motor of the corresponding hydraulic-electric hybrid driven actuator is controlled, so that pressure of the driving cavities of the hydraulic-electric hybrid driven actuators is equal, which greatly reduces the throttling loss caused by load differences among hydraulic-electric hybrid driven actuators. In addition, power of the hydraulic-electric hybrid driven actuators is supplemented by arranging the control valves and the centralized hydraulic units, which may realize that a low-power motor driving and pull high-power actuators, significantly reducing total installed power of the multi-actuator system, especially for multi-actuator engineering equipment.

BRIEF DESCRIPTION OF THE DRAWINGS

In order to illustrate the embodiments of the present disclosure or the technical solutions of the conventional art more clearly, the accompanying drawing used in the embodiments will be briefly described below. Apparently, the accompanying drawing described below show merely some embodiments of the present disclosure. For those of ordinary skill in the art, other drawings can be obtained according to the accompanying drawings without creative efforts.

REFERENCE NUMERALS

Figure 1:
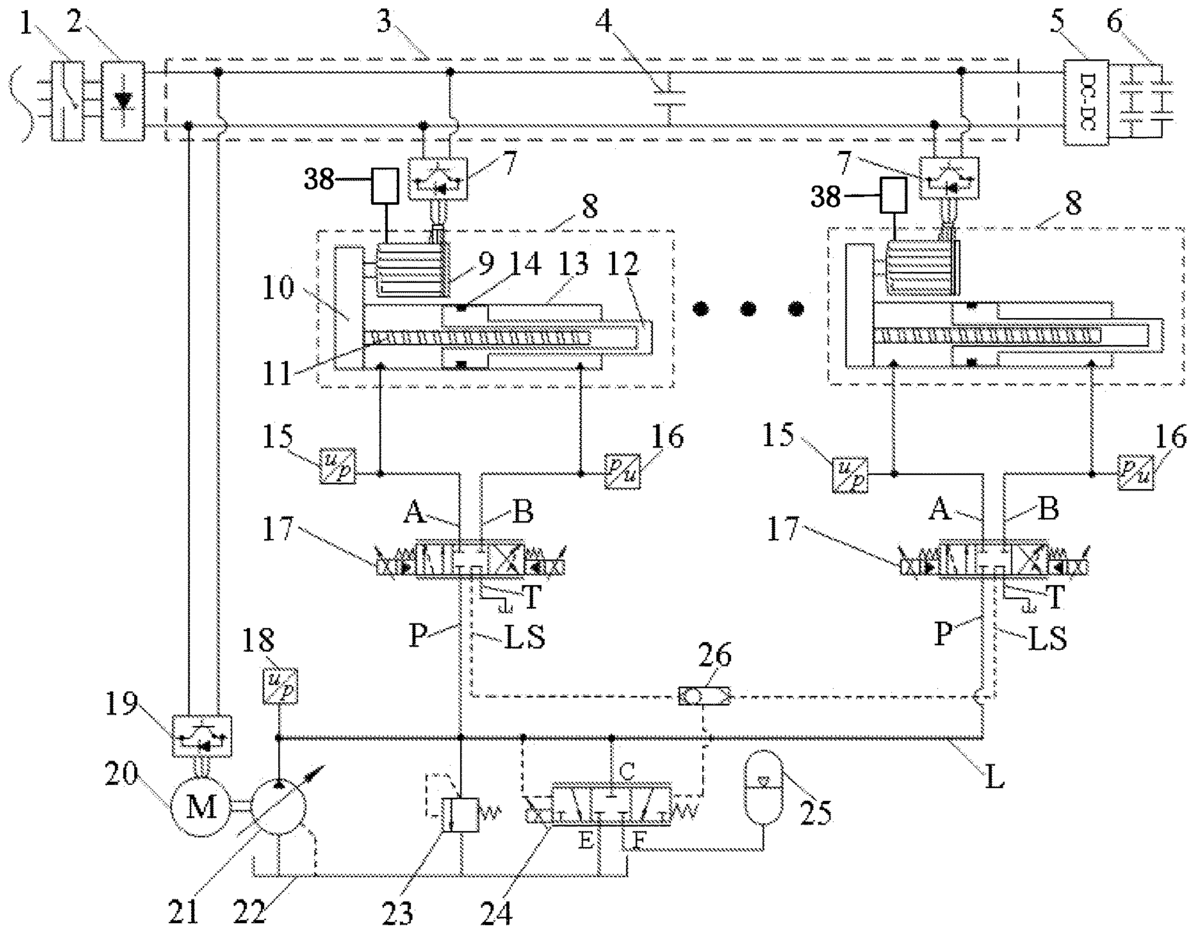
FIG. 1 is a structural schematic diagram of a hydraulic-electric coupling driven multi-actuator system of the present disclosure.

1, power switch; 2, rectifier; 3, direct-current bus; 4, filter capacitor; 5, direct current-direct current (DC-DC) converter; 6, super-capacitor group;

7, first inverter; 7-1, 7-2, movable arm associated inverter; 7-3, 7-4, bucket rod associated inverter; 7-5, rotation associated inverter;

8, hydraulic-electric hybrid driven actuator; 8-1, 8-2, movable arm associated hydraulic-electric hybrid driven actuator; 8-3, 8-4, bucket rod associated hydraulic-electric hybrid driven actuator;

9, first motor; 10, speed reducer; 11, lead screw; 12, push rod; 13, cylinder barrel; 14, sealing member;

15, 15-1, 15-2, 15-3, 15-4, first pressure sensor; 16, 16-1, 16-2, 16-3, 16-4, second pressure sensor;

17, control valve; 17-1, movable arm associated control valve; 17-2, bucket associated control valve; 17-3, bucket rod associated control valve; 17-4, rotation associated control valve;

18, 18-1, 18-2, third pressure sensor; 19, 19-1, 19-2, second inverter; 20, 20-1, 20-2, second motor; 21, 21-1, 21-2, hydraulic pump; 22, oil tank; 23, 23-1, 23-2, overflow valve; 24, bypass proportional valve; 25, energy accumulator; 26, shuttle valve; 27, pressure difference compensator; 28, valve core displacement sensor; 29, switch valve;

30, walking device; 31, rotary motor; 32, rotary platform; 33, movable arm; 34, bucket rod; 35, bucket; 36, bucket hydraulic cylinder; 37, rotation motor; 38, motor controller;

A, first working oil port of control valve; B, second working oil port of control valve; P, oil inlet of control valve; T, oil return port of control valve; LS, load pressure detection end of control valve; L, oil supply pipeline; E, first working oil port of bypass proportional valve; F, second working oil port of bypass proportional valve; and C, third working oil port of bypass proportional valve.

DETAILED DESCRIPTION

The technical solutions in the embodiments of the present disclosure will be clearly and completely described below in conjunction with the accompanying drawings in the embodiments of the present disclosure. Apparently, the described embodiments are merely a part of the embodiments of the present disclosure, rather than all of the embodiments. All other embodiments obtained by the ordinary skilled in the art based on the embodiment of the present disclosure without creative efforts shall fall within the scope of protection of the present disclosure.

The present disclosure aims to provide a hydraulic-electric coupling driven multi-actuator system and control method. Pressure information of each hydraulic-electric hybrid driven actuator is detected by a pressure sensor, and based on the pressure information, output torque of a motor of a corresponding hydraulic-electric hybrid driven actuator is controlled, so that pressure of the driving cavities of the hydraulic-electric hybrid driven actuators is equal, which greatly reduces throttling loss caused by load differences among hydraulic-electric hybrid driven actuators. In addition, power of the hydraulic-electric hybrid driven actuators is supplemented by arranging control valves and centralized hydraulic units, which may realize that a low-power motor driving and pull high-power actuators, significantly reducing total installed power of the multi-actuator system, especially for multi-actuator engineering equipment.

To make the foregoing objectives, features and advantages of the present disclosure clearer and more comprehensible, the present disclosure is described in further detail below in conjunction with the accompanying drawings and specific implementations.

As shown in FIG. 1, the hydraulic-electric coupling driven multi-actuator system of the present disclosure includes: one or more hydraulic-electric hybrid driven actuators 8; first inverters 7, control valves 17 and pressure sensor groups; centralized hydraulic units; and motor controllers 38.

The number of the first inverters 7, the number of the control valves 17 and the number of the pressure sensor groups are the same as that of the hydraulic-electric hybrid driven actuators 8 respectively. Preferably, the control valve 17 is a three-position four-way control valve with a load pressure feedback function.

Each hydraulic-electric hybrid driven actuator 8 is correspondingly connected with one first inverter 7, one control valve 17 and one pressure sensor group. The pressure sensor group is configured to detect pressure information of a corresponding hydraulic-electric hybrid driven actuator 8.

The centralized hydraulic units are connected with the control valves 17 and configured to supply oil for the hydraulic-electric hybrid driven actuators 8 and perform power compensation.

The each motor controller 38 is configured to, based on the pressure information of a corresponding hydraulic-electric hybrid driven actuator 8, control output torque of the first motor of the corresponding hydraulic-electric hybrid driven actuator 8, such that pressure of the driving cavities of the hydraulic-electric hybrid driven actuators 8 is equal. Without throttling loss, influence of the load differences of respective actuators is eliminated which greatly reduces the throttling loss caused by the difference pressure of the driving cavities of the hydraulic-electric hybrid driven actuators 8.

In the present disclosure, power of all the first motors is supplemented by arranging the control valves 17 and the centralized hydraulic units, which may realize that the low-power motor can drive and pull the high-power actuators, significantly reducing the total installed power of the multi-actuator system, especially for the multi-actuator engineering equipment.

Further, the hydraulic-electric hybrid driven actuator 8 includes the first motor 9, a speed reducer 10, a cylinder barrel 13, a push rod 12 and a lead screw 11.

Where, the speed reducer 10 is connected with the first motor 9.

The cylinder barrel 13 is fixedly connected with the speed reducer 10.

The push rod 12 is arranged in the cylinder barrel 13 and movably connected with the cylinder barrel 13.

The lead screw 11 is arranged in the cylinder barrel 13. One end of the lead screw 11 is connected with the speed reducer 10, and the other end of the lead screw 11 is connected with the push rod 12 through a screw transmission pair. The lead screw 11 performs rotary motion under the control of the first motor 9 and the speed reducer, and further drives the push rod 12 to perform linear motion through the screw transmission pair. Due to mechanical transmission, the hydraulic-electric hybrid driven actuator has better control performance.

A sealing member 14 is arranged between the push rod 12 and the cylinder barrel 14. The cylinder barrel 13 is divided into two cavities by the sealing member 14, i.e., a rodless cavity close to the speed reducer and a rod cavity close to the push rod 12.

The working oil ports of each control valve 17 respectively communicate with two cavities of the corresponding hydraulic-electric hybrid driven actuator 8. The control valve 17 is configured to provide power compensation for the corresponding hydraulic-electric hybrid driven actuator 8 through the working oil ports based on the pressure information of the driving cavity of the corresponding hydraulic-electric hybrid driven actuator 8. An oil return port of the control valve 17 communicates with an oil tank 22.

On the basis of ensuring the flow distribution accuracy of the system, opening of a valve port of each associated control valve 17 is increased, the throttling loss of the valve ports is reduced maximumly, thereby minimizing the throttling loss of the control valves 17, and further the throttling loss of the whole system.

Furthermore, the pressure sensor group includes a first pressure sensor 15 and a second pressure sensor 16.

Wherein, the first pressure sensor 15 is connected with the rodless cavity of the corresponding hydraulic-electric hybrid driven actuator 8 and configured for detecting the pressure information of the rodless cavity of the corresponding hydraulic-electric hybrid driven actuator 8.

The second pressure sensor 16 is connected with the rod cavity of the corresponding hydraulic-electric hybrid driven actuator 8 and configured for detecting the pressure information of the rod cavity of the corresponding hydraulic-electric hybrid driven actuator 8.

Specifically, the centralized hydraulic unit includes a second inverter 19, a second motor 20, a hydraulic pump 21, an oil tank 22, an oil supply pipeline L, an overflow valve 23, a bypass proportional valve 24, an energy accumulator 25 and a shuttle valve 26.

The second motor 20 is connected with the second inverter 19.

The hydraulic pump 21 is coaxially connected with the second motor 20, an oil suction port of the hydraulic pump 21 communicates with the oil tank 22, and an oil outlet of the hydraulic pump 21 communicates with the oil supply pipeline L.

The overflow valve 23 respectively communicates with the oil supply pipeline L and the oil tank 22.

The shuttle valve 26 is connected with a load detection end of the control valve 17 corresponding to each hydraulic-electric hybrid driven actuator 8 and configured to detect the maximum load pressure of the hydraulic-electric hybrid driven actuator 8.

The bypass proportional valve 24 is provided with a first working oil port E, a second working oil port F, a third working oil port C, a spring end and a pressure detection end.

The first working oil port E of the bypass proportional valve 24 communicates with the oil tank 22. The second working oil port F of the bypass proportional valve 24 communicates with the energy accumulator 25. The third working oil port C of the bypass proportional valve 24 communicates with the oil supply pipeline. The spring end of the bypass proportional valve 24 is connected with the shuttle valve 26, and the spring end of the bypass proportional valve 24 is configured to detect the maximum load feedback pressure of each hydraulic-electric hybrid driven actuator 8.

The pressure detection end of the bypass proportional valve 24 is connected with the oil supply pipeline L, and configured to detect the outlet pressure of the hydraulic pump 21.

The bypass proportional valve 24 is controlled by the outlet pressure of the hydraulic pump 21, load feedback pressure and spring force, such that the outlet pressure of the hydraulic pump 21 is always higher than a load pressure by a fixed value.

In an embodiment, the centralized hydraulic unit further includes a third pressure sensor 18. The third pressure sensor 18 communicates with the oil supply pipeline L, and the third pressure sensor 18 is configured to detect the pressure of the oil supply pipeline L in real time.

In an embodiment, the hydraulic-electric coupling driven multi-actuator system further includes a direct-current bus 3. The direct-current bus 3 is respectively connected with the first inverter 7 and the second inverter 19, and configured to perform energy distribution and energy sharing on each hydraulic-electric hybrid driven actuator 8.

Further, the hydraulic-electric coupling driven multi-actuator system further includes a power switch 1, a rectifier 2, a direct current-direct current (DC-DC) converter 5 and a super-capacitor group 6 sequentially connected over the direct-current bus 3.

Through the direct-current bus 3 and the super-capacitor group 6, kinetic and potential energy recycling may be achieved. When the hydraulic-electric hybrid driven actuator 8 is in an overload working condition, the kinetic and potential energy of the actuator is converted into electric energy by the first motor 9, and the electric energy is stored in the super-capacitor group 6 by the direct-current bus 3. The kinetic and potential energy generated by the system may also be directly utilized by the direct-current bus 3 to realize energy sharing. The excess energy may be further converted into hydraulic energy by the second motor 20 and the hydraulic pump 21 of the centralized hydraulic unit, and the hydraulic energy is stored in the energy accumulator 25. The energy utilization process is opposite to the recovery process.

In the embodiment, the energy accumulator 25 is one of an air bag energy accumulator, a piston energy accumulator and a spring energy accumulator. The second motor 20 is electrically connected with the direct-current bus 3 through the second inverter 19 to obtain power.

Figure 2:
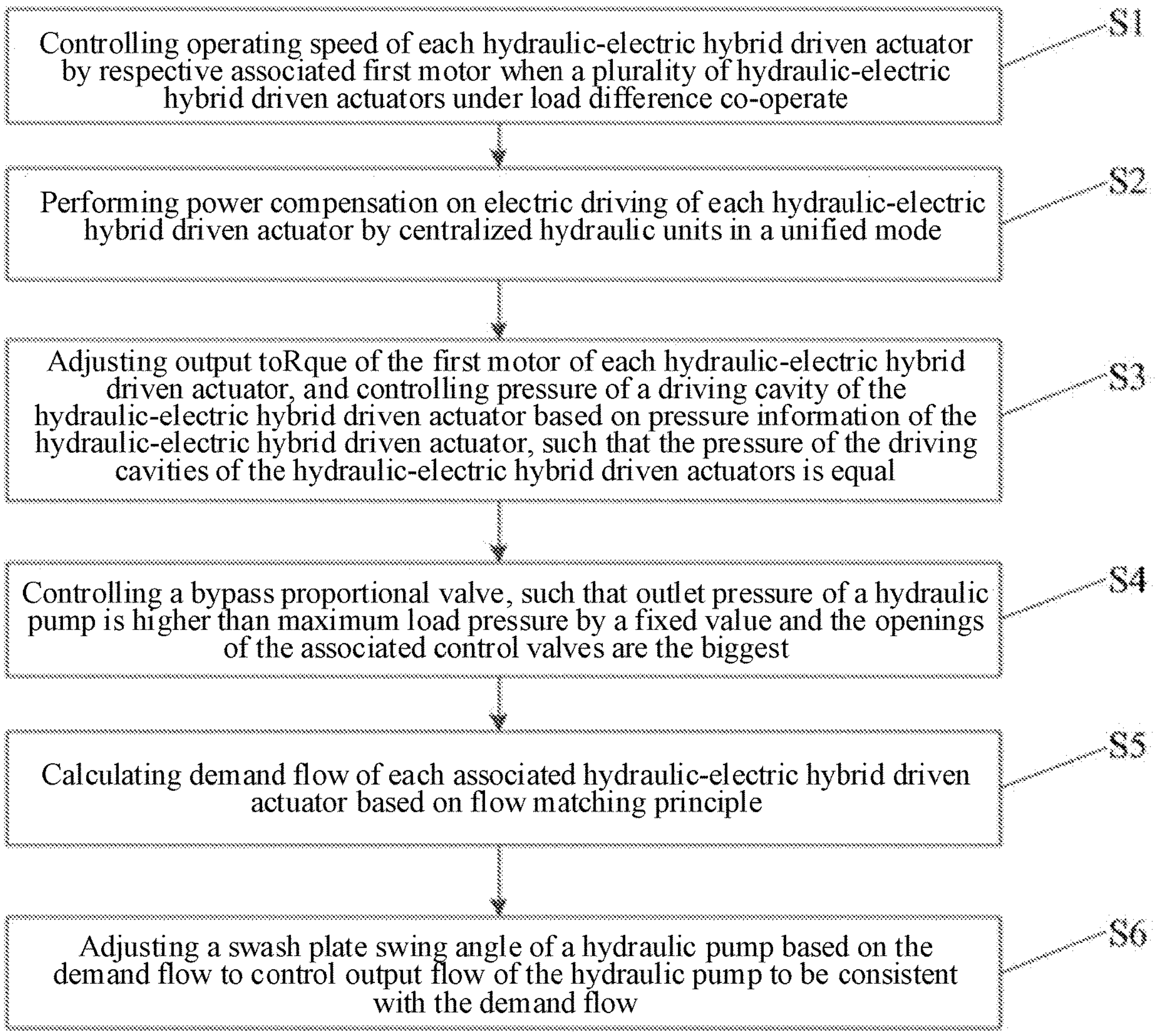
FIG. 2 is a flow chart of a hydraulic-electric coupling driven multi-actuator control method of the present disclosure.

As shown in FIG. 2, a hydraulic-electric coupling driven multi-actuator control method in the present disclosure includes steps S1, S2 and S3.

S1: The operating speed of each hydraulic-electric hybrid driven actuator 8 is controlled by the respective associated first motor when a plurality of hydraulic-electric hybrid driven actuators 8 under load difference co-operate.

S2: Power compensation is performed on electric driving of each hydraulic-electric hybrid driven actuator 8 by the centralized hydraulic units in a unified mode.

S3: According to the pressure information of the hydraulic-electric hybrid driven actuator 8, the output torque of the first motor of the hydraulic-electric hybrid driven actuator 8 is adjusted, to control the pressure of the driving cavity of the hydraulic-electric hybrid driven actuator 8, such that the pressure of the driving cavities of the hydraulic-electric hybrid driven actuators 8 is equal.

Further, the hydraulic-electric coupling driven multi-actuator control method further includes step S4.

S4: A bypass proportional valve is controlled, such that outlet pressure of the hydraulic pump 21 is higher than the maximum load pressure by a fixed value and the openings of the associated control valves 17 are the biggest.

Furthermore, the hydraulic-electric coupling driven multi-actuator control method further includes steps S5 and S6.

S5: Demand flow of each associated hydraulic-electric hybrid driven actuator 8 is calculated based on flow matching principle.

S6: A swash plate swing angle of a hydraulic pump 21 is adjusted based on the demand flow to control output flow of the hydraulic pump 21 to be consistent with the demand flow.

One embodiment of the hydraulic-electric coupling driven multi-actuator system and control method of the present disclosure applied to an excavator is described as follows.

Figure 3:
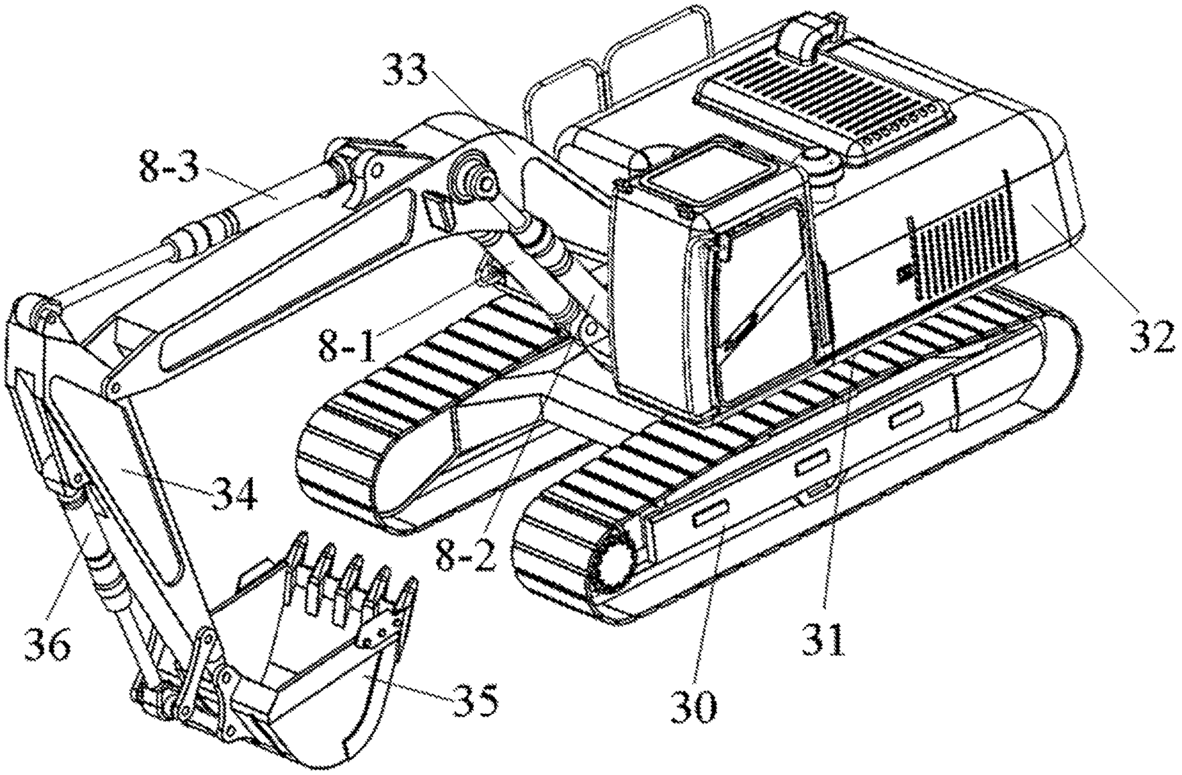
FIG. 3 is a mechanical structure schematic diagram of a hydraulic-electric coupling driven excavator.

FIG. 3 is a mechanical structure schematic diagram of a hydraulic-electric coupling driven excavator in the present disclosure. As widely applied typical multi-actuator mechanical equipment, the excavator mainly includes a walking device 30, a rotary platform 32 arranged on the walking device 30, a rotary motor 31 for driving the rotary platform 32 to rotate, a movable arm 33 which is connected with the rotary platform 32 and relatively rotates in the up-and-down direction, movable arm associated hydraulic-electric hybrid driven actuators 8-1, 8-2 for driving the movable arm 33 to lift up and down, a bucket rod 34 which is mounted at the front end of the movable arm 33 and may relatively rotate, a bucket rod associated hydraulic-electric hybrid driven actuator 8-3 for driving the bucket rod 34 to move, a bucket 35 which is mounted at the front end of the bucket rod 34 and may relatively rotate, and a bucket hydraulic cylinder 36 for driving the bucket 35 to move.

Figure 4:
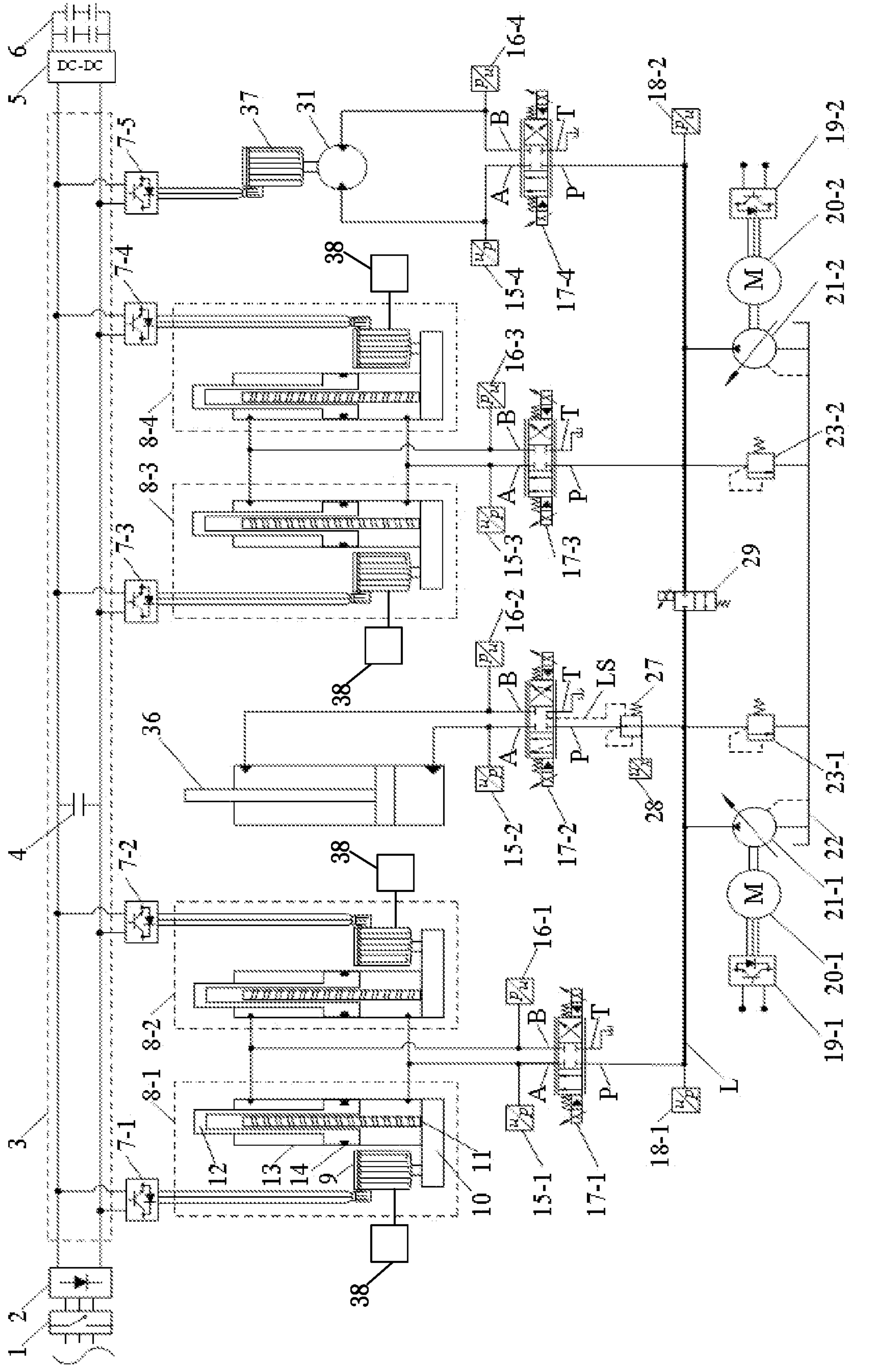
FIG. 4 is a schematic circuit diagram of a hydraulic-electric coupling driven multi-actuator system applied to the complete excavator machine according to the present disclosure.

FIG. 4 is a schematic circuit diagram of a hydraulic-electric coupling driven multi-actuator system applied to the complete excavator machine according to the present disclosure. As shown in FIG. 4, the circuit of the electrically driven excavator includes:

- a direct-current bus 3;
- one or two movable arm associated hydraulic-electric hybrid driven actuators 8-1, 8-2, one or two movable arm associated inverters 7-1, 7-2 and a movable arm associated control valve 17-1;
- one or two bucket rod associated hydraulic-electric hybrid driven actuators 8-3, 8-4, one or two bucket rod associated inverters 7-3, 7-4 and a bucket rod associated control valve 17-3;
- a bucket hydraulic cylinder 36 and a bucket associated control valve 17-2;
- a rotary motor 31, a rotation motor 37, a rotation associated inverter 7-5 and a rotation associated control valve 17-4; and
- two centralized hydraulic units and control units. Each centralized hydraulic unit includes the second inverter 19, the second motor 20, the hydraulic pump, the oil tank 22 and the overflow valve 23.

The direct-current bus 3 is connected with the power switch 1, the rectifier 2, the filter capacitor 4, the DC-DC converter 5 and the super-capacitor group 6.

The movable arm associated inverters 7-1, 7-2, the bucket rod associated inverters 7-3, 7-4, the rotation associated inverter 7-5, and the second inverters 19-1, 19-2 are electrically connected with the direct-current bus 3.

The direct-current bus 3 distributes power and shares energy for each actuator through each inverter, and stores excess energy into the super-capacitor group 6.

The movable arm associated hydraulic-electric hybrid driven actuators 8-1, 8-2 are hydraulic-electric hybrid driven actuators of the hydraulic-electric coupling driven multi-actuator system in the present disclosure. The movable arm associated hydraulic-electric hybrid driven actuators 8-1, 8-2 are respectively connected with the movable arm associated inverters 7-1, 7-2. The two cavities of the movable arm associated hydraulic-electric hybrid driven actuator respectively communicate with the working oil ports A, B of the movable arm associated control valve 17-1.

The bucket rod associated hydraulic-electric hybrid driven actuators 8-3, 8-4 are hydraulic-electric hybrid driven actuators of the hydraulic-electric coupling driven multi-actuator system in the present disclosure. The bucket rod associated hydraulic-electric hybrid driven actuators 8-3, 8-4 are respectively connected with the bucket rod associated inverters 7-3, 7-4. The two cavities of the bucket rod associated hydraulic-electric hybrid driven actuator respectively communicate with the working oil ports A, B of the bucket rod associated control valve 17-3.

The rotary motor 31 is coaxially connected with the rotation motor 37. The rotation motor 37 is connected with the rotation associated inverter 7-5. The two cavities of the rotary motor respectively communicate with the working oil ports A, B of the rotation associated control valve 17-4.

The two cavities of the bucket hydraulic cylinder 36 respectively communicate with the working oil ports A, B of the bucket associated control valve 17-2, and the bucket association is further provided with a pressure difference compensator 27 and a valve core displacement sensor 28. The oil outlet of the pressure difference compensator communicates with the oil inlet of the bucket associated control valve 17-2. The bucket associated control valve 17-2 is a three-position four-way control valve with a load pressure detection function. The spring end of the pressure difference compensator 17-2 communicates with the load pressure detection port LS, and the other end of the pressure difference compensator 17-2 communicates with the oil inlet P of the control valve.

The centralized hydraulic unit is the centralized hydraulic unit of the hydraulic-electric coupling driven multi-actuator system in the present disclosure. A first centralized hydraulic unit is connected with the movable arm associated control valve 17-1 and the bucket associated control valve 17-2, and a second centralized hydraulic unit is connected with the bucket rod associated control valve 17-3 and the rotation associated control valve 17-4. The centralize hydraulic units are configured to supply oil for the movable arm associated hydraulic-electric hybrid driven actuator, the bucket rod associated hydraulic-electric hybrid driven actuator, the rotary motor and the bucket hydraulic cylinder to perform power compensation.

The first centralized hydraulic unit and the second centralized hydraulic unit are connected through the switch valve 29. When a single centralized hydraulic unit does not provide enough flow, the control unit controls the switch valve 29 to communicate the two centralized hydraulic units for confluence to supply oil for the actuators.

The control unit is respectively connected with each hydraulic-electric hybrid driven actuator, the rotation motor, the control valve, the switch valve, the second motor and the hydraulic pump.

The control unit controls the motor output torques of the corresponding movable arm associated hydraulic-electric hybrid driven actuators 8-1, 8-2, the motor output torques of the bucket rod associated hydraulic-electric hybrid driven actuators 8-3, 8-4 and the output torque of the rotation motor 37 according to the movable arm associated hydraulic-electric hybrid driven actuators 8-1, 8-2, the bucket rod associated hydraulic-electric hybrid driven actuators 8-3, 8-4, and the rotary motor 31, the bucket hydraulic cylinder 36 and the maximum load pressure information of multiple actuators detected by the pressure sensors, to compensate the load differences among the multiple actuators, such that the pressure of the driving cavities of the actuators under coordination actions is equal as much as possible, and the throttling loss at the control valve ports caused by the load difference of multiple actuators is reduced.

The specific control method of the excavator system is the same as the hydraulic-electric coupling driven multi-actuator control method of the present disclosure.

In this specification, several specific examples are used for illustration of the principles and implementations of the present disclosure. The descriptions of the foregoing embodiments are used to help understanding the method of the present disclosure and the core ideas thereof. In addition, for those of ordinary skill in the art, there will be changes in the specific embodiments and the scope of application in accordance with the teachings of the present disclosure. In conclusion, the content of this specification shall not be construed as a limitation to the present disclosure.

What is claimed is:

1. A hydraulic-electric coupling driven multi-actuator system, comprising:

one or more hydraulic-electric hybrid driven actuators;

first inverters, control valves and pressure sensor groups;

wherein:

a number of the first inverters, a number of the control valves and a number of the pressure sensor groups are the same as a number of the hydraulic-electric hybrid driven actuators, respectively;

each hydraulic-electric hybrid driven actuator is correspondingly connected with one of the first inverters, one of the control valves and one of the pressure sensor groups; and the pressure sensor group is configured to detect pressure information of a corresponding one of the hydraulic-electric hybrid driven actuators;

centralized hydraulic units, connected with the control valves and configured to supply oil for the hydraulic-electric hybrid driven actuators; and motor controllers each being configured to control output torque of a first motor of the corresponding hydraulic-electric hybrid driven actuator based on the pressure information of the hydraulic-electric hybrid driven actuator, such that pressure of each driving cavity of the hydraulic-electric hybrid driven actuators is equal;

wherein:

each of the centralized hydraulic units comprise a second inverter, a second motor, a hydraulic pump, an oil tank, an oil supply pipeline, an overflow valve, a bypass proportional valve, and a shuttle valve;

the second motor is connected with the second inverter;

the hydraulic pump is coaxially connected with the second motor, an oil suction port of the hydraulic pump communicates with the oil tank, and an oil outlet of the hydraulic pump communicates with the oil supply pipeline;

the overflow valve respectively communicates with the oil supply pipeline and the oil tank;

the shuttle valve is connected with a load detection end of each control valve corresponding to each hydraulic-electric hybrid driven actuator and configured to detect a maximum load pressure of the one or more hydraulic-electric hybrid driven actuators;

the bypass proportional valve is provided with a first working oil port, a second working oil port, a third working oil port, a spring end and a pressure detection end;

the first working oil port of the bypass proportional valve communicates with the oil tank;

the second working oil port of the bypass proportional valve communicates with an energy accumulator;

the third working oil port of the bypass proportional valve communicates with the oil supply pipeline; and the spring end of the bypass proportional valve is connected with the shuttle valve and configured to detect the maximum load pressure of the hydraulic-electric hybrid driven actuators;

the pressure detection end of the bypass proportional valve is connected with the oil supply pipeline and configured to detect outlet pressure of the hydraulic pump;

an oil return port of each of the control valves communicates with the oil tank, and working oil ports of each of the control valves communicate with the corresponding hydraulic-electric hybrid driven actuator; and the bypass proportional valve is controlled by the outlet pressure of the hydraulic pump, the maximum load pressure and spring force, such that the outlet pressure of the hydraulic pump is always higher than the maximum load pressure by a fixed value.

2. The hydraulic-electric coupling driven multi-actuator system according to claim 1, wherein the hydraulic-electric hybrid driven actuator comprises:

the first motor;

a speed reducer connected with the first motor;

a cylinder barrel fixedly connected with the speed reducer;

a push rod arranged in the cylinder barrel and movably connected with the cylinder barrel;

a lead screw arranged in the cylinder barrel;

wherein:

one end of the lead screw is connected with the speed reducer, and another end of the lead screw is connected with the push rod through a screw transmission pair; and the lead screw performs rotary motion under the control of the first motor and the speed reducer, and further drives the push rod to perform linear motion through the screw transmission pair; and a sealing member arranged between the push rod and the cylinder barrel; wherein the cylinder barrel is divided into a rodless cavity and a rod cavity by the sealing member, a side, close to the speed reducer, of the cylinder barrel is the rodless cavity, and another side, close to the push rod, of the cylinder barrel is the rod cavity;

wherein:

driving cavity is one of the rodless cavity and the rod cavity;

the working oil ports of each control valve respectively communicate with the rodless cavity and the rod cavity of the corresponding hydraulic-electric hybrid driven actuator; and each control valve is configured to control oil supply for the corresponding hydraulic-electric hybrid driven actuator through the working oil ports based on the pressure information of the driving cavity of the corresponding hydraulic-electric hybrid driven actuator.

3. The hydraulic-electric coupling driven multi-actuator system according to claim 2, wherein each pressure sensor group comprises:

a first pressure sensor connected with the rodless cavity of the corresponding hydraulic-electric hybrid driven actuator and configured to detect the pressure information of the rodless cavity of the corresponding hydraulic-electric hybrid driven actuator; and a second pressure sensor connected with the rod cavity of the corresponding hydraulic-electric hybrid driven actuator and configured to detect the pressure information of the rod cavity of the corresponding hydraulic-electric hybrid driven actuator.

4. The hydraulic-electric coupling driven multi-actuator system according to claim 1, further comprising: a direct-current bus respectively connected with the first inverter and the second inverter and configured to perform energy distribution and energy sharing on each hydraulic-electric hybrid driven actuator.

5. The hydraulic-electric coupling driven multi-actuator system according to claim 4, further comprising a power switch, a rectifier, a direct current-direct current (DC-DC) converter and a super-capacitor group sequentially connected on the direct-current bus.

6. A hydraulic-electric coupling driven multi-actuator control method, comprising:

controlling operating speed of each hydraulic-electric hybrid driven actuator by respective associated first motor when a plurality of the hydraulic-electric hybrid driven actuators under load difference co-operate;

supplying oil for each hydraulic-electric hybrid driven actuator by centralized hydraulic units; and adjusting output torque of the first motor of each hydraulic-electric hybrid driven actuator by respective motor controller to control pressure of a driving cavity of the hydraulic-electric hybrid driven actuator based on pressure information of the hydraulic-electric hybrid driven actuator, such that the pressure of each driving cavity of the hydraulic-electric hybrid driven actuators is equal;

wherein:

each of the centralized hydraulic units comprise a second inverter, a second motor, a hydraulic pump, an oil tank, an oil supply pipeline, an overflow valve, a bypass proportional valve, and a shuttle valve;

the second motor is connected with the second inverter;

the hydraulic pump is coaxially connected with the second motor, an oil suction port of the hydraulic pump communicates with the oil tank, and an oil outlet of the hydraulic pump communicates with the oil supply pipeline;

the overflow valve respectively communicates with the oil supply pipeline and the oil tank;

the shuttle valve is connected with a load detection end of a control valve corresponding to each hydraulic-electric hybrid driven actuator and configured to detect a maximum load pressure of the hydraulic-electric hybrid driven actuators, the bypass proportional valve is provided with a first working oil port, a second working oil port, a third working oil port, a spring end and a pressure detection end;

the first working oil port of the bypass proportional valve communicates with the oil tank;

the second working oil port of the bypass proportional valve communicates with an energy accumulator;

the third working oil port of the bypass proportional valve communicates with the oil supply pipeline; and the spring end of the bypass proportional valve is connected with the shuttle valve and configured to detect the maximum load pressure of the hydraulic-electric hybrid driven actuator;

the pressure detection end of the bypass proportional valve is connected with the oil supply pipeline and configured to detect outlet pressure of the hydraulic pump;

an oil return port of each of the control valves communicates with the oil tank, and working oil ports of each of the control valves communicate with the corresponding hydraulic-electric hybrid driven actuator; and the bypass proportional valve is controlled by the outlet pressure of the hydraulic pump, the maximum load pressure and spring force, such that the outlet pressure of the hydraulic pump is always higher than the maximum load pressure by a fixed value.

* * * * *